United States Patent [19]
Yokoyama et al.

[11] Patent Number: 5,345,836
[45] Date of Patent: Sep. 13, 1994

[54] SHIFT LEVER DEVICE FOR AUTOMATIC TRANSMISSION

[75] Inventors: Yoshinobu Yokoyama; Tatsuya Aoki; Etsuo Shimizu, all of Aichi, Japan

[73] Assignee: Kabushiki Kaisha Tokai-Rika-Denki-Seisakusho, Aichi, Japan

[21] Appl. No.: 974,355

[22] Filed: Nov. 10, 1992

Related U.S. Application Data

[63] Continuation of Ser. No. 763,594, Sep. 23, 1991, abandoned.

[30] Foreign Application Priority Data

Sep. 26, 1990 [JP] Japan .............................. 2-100599[U]

[51] Int. Cl.⁵ .............................................. B60K 20/04
[52] U.S. Cl. .................................. 74/473 R; 200/61.88
[58] Field of Search .......................... 74/473 R, 483 K; 200/61.88

[56] References Cited

U.S. PATENT DOCUMENTS

| | | | |
|---|---|---|---|
| 4,105,994 | 8/1978 | Chicoine | 200/61.88 X |
| 4,144,424 | 3/1979 | Takeda et al. | 200/61.88 |
| 4,199,747 | 4/1980 | Miller et al. | 200/61.88 X |
| 4,360,718 | 11/1982 | Schobinger et al. | 200/61.88 |
| 5,033,324 | 7/1991 | Glaser | 74/335 X |
| 5,172,603 | 12/1992 | MacInnis | 74/473 R X |
| 5,189,924 | 3/1993 | Altenheiner et al. | 74/473 R |

FOREIGN PATENT DOCUMENTS 55-170720 12/1980 Japan .
132090 10/1989 Japan .

Primary Examiner—Leslie A. Braun
Assistant Examiner—Khoi Ta
Attorney, Agent, or Firm—Sixbey, Friedman, Leedom & Ferguson

[57] ABSTRACT

Disclosed herein is a shift lever device for an automatic transmission for use in a vehicle such as an automobile, etc. A female connector is disposed in a position inwardly away from the outer periphery of a shift lever and laid on an axially-extending portion thereof. In addition, the female connector is held in position by a connector support disposed below the female connector. A knob is inserted into and fixed to one end of the shift lever. A male connector and a switch are fixed to an intermediate portion of the knob. When the knob is inserted into the shift lever, the male connector is disposed in such a way as to be fitted into the female connector. It is therefore possible to form the knob so as to cover the one end of the shift lever on a small scale.

16 Claims, 3 Drawing Sheets

SHIFT LEVER DEVICE FOR AUTOMATIC TRANSMISSION

This application is a continuation of Ser. No. 07/763,594, filed Sep. 23, 1991, now abandoned.

BACKGROUND OF THE INVENTION

1. Field of the Invention

The present invention relates to a shift lever device for an automatic transmission, which is mounted on a vehicle such as an automobile, etc.

2. Description of the Related Art

There is known a shift lever device for an automatic transmission, of a type wherein an overdrive switch is mounted on a knob attached to the leading end of a shift lever (see Japanese Utility Model Application Publication No. 1-32090).

In this type of shift lever device, a male connector mounted on an overdrive switch is disposed on the outer peripheral surface of a shift lever. In addition, a female connector or the like coupled to the male connector is also mounted on the outer peripheral surface of the shift lever.

Thus, the knob for covering a part of the shift lever makes it necessary to cover both the male connector and the female connector mounted on the outer peripheral surface of the shift lever in addition to the shift lever.

As a result, the shift lever device referred to above has the problem that the knob is large in size.

SUMMARY OF THE INVENTION

With the foregoing problem in view, it is an object of the present invention to provide a shift lever device for an automatic transmission, which is provided with a small-sized knob.

The present invention is suitable for use in a shift lever device for an automatic transmission, which is employed in a vehicle such as an automobile, etc. In the shift lever device, a first connecting means is located at a position inwardly away from either the outer periphery of a shift lever or an axially-extending portion thereof and held in position by a support member disposed below the first connecting means. A knob is inserted into and fixed to one end of the shift lever. A second connecting means is fixed to a substantially longitudinal-extending intermediate portion of the knob. A connecting member as the second connecting means is disposed in such a manner that the first connecting means is fit in the connecting member as the second connecting means when the knob is inserted into the shift lever.

According to the above-described construction of the present invention, when it is desired to select one of shift positions, the knob is gripped and the shift lever is swingably moved. As a consequence, the shift lever can be shifted to another shift position. A second connector mounted on a switch and a first connector coupled to the second connector are both disposed in a position inwardly away from either the outer peripheral surface of the shift lever or laid on an axially-extending portion thereof. Thus, the first and second connectors are not disposed on the outer peripheral surface of the shift lever. It is therefore possible to form the knob used to cover one end of the shift lever on a small scale.

As described above, the shift lever device for the vehicle automatic transmission according to the present invention can bring about an excellent effect in that the knob can be rendered small in size because the second connector attached to the switch and the first connector are respectively provided either inside the shift lever or at the axially-extending portion thereof.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
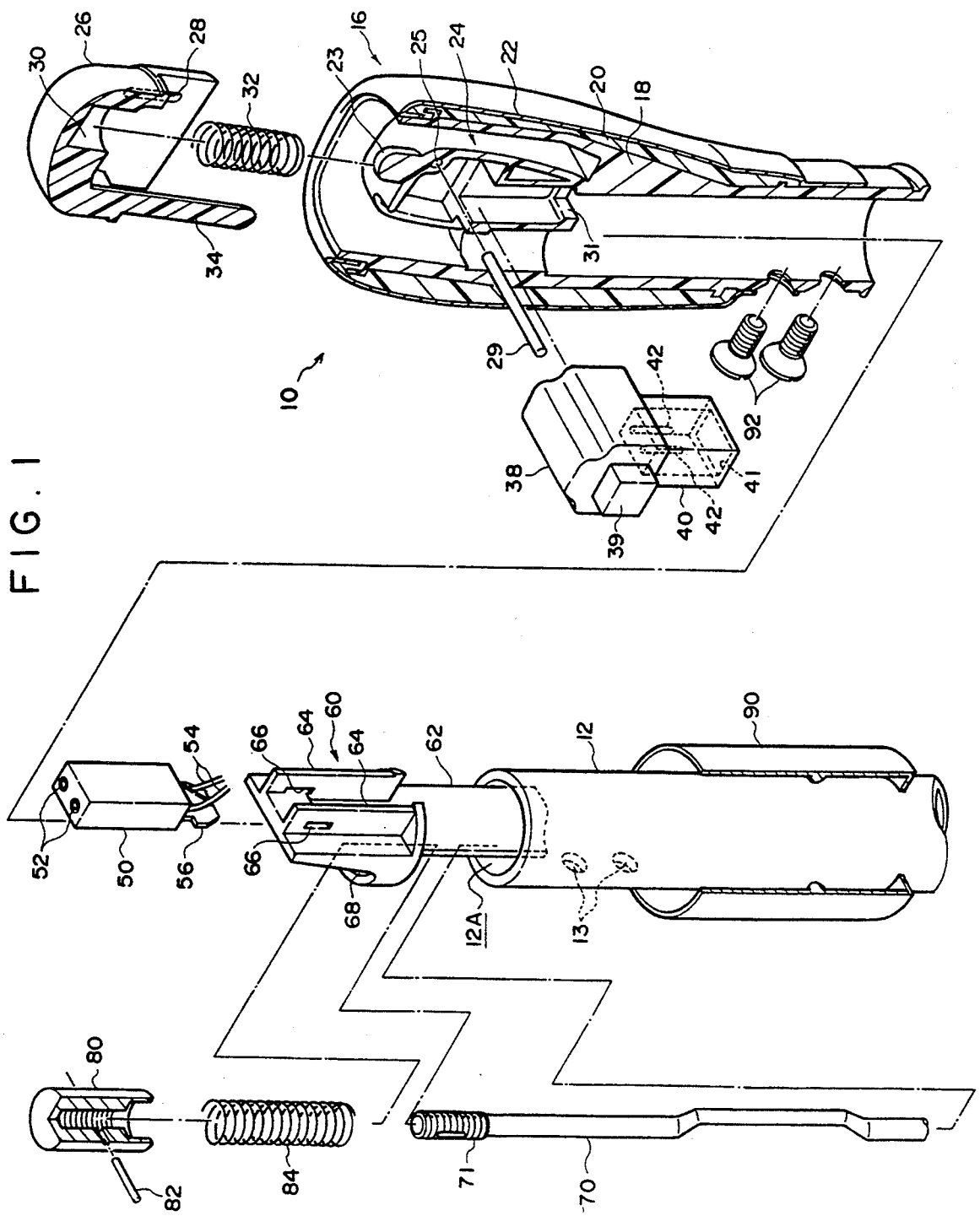
FIG. 1 is an exploded perspective view showing a knob of a shift lever device according to one embodiment of the present invention.
Figure 2:
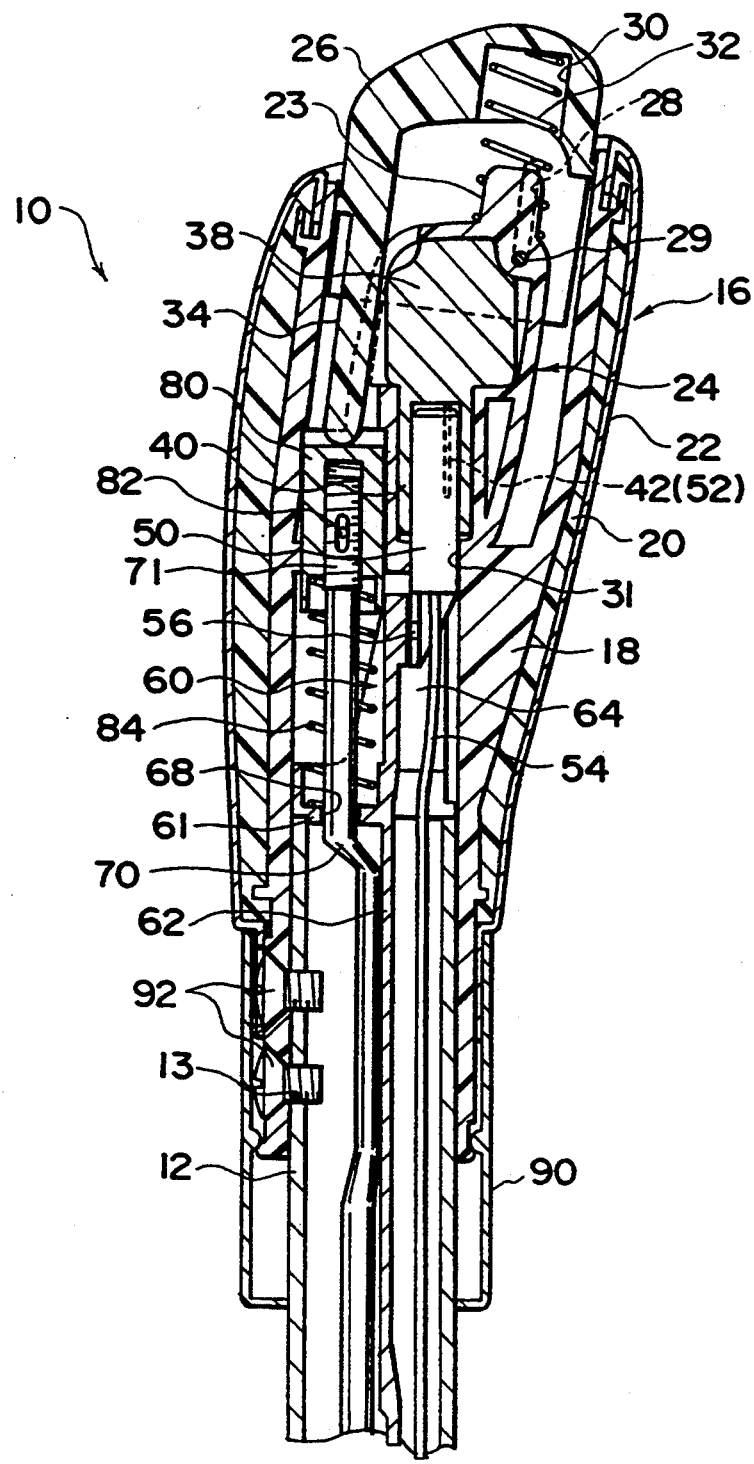
FIG. 2 is a cross-sectional view of the knob of the shift level device shown in FIG. 1.
Figure 3:
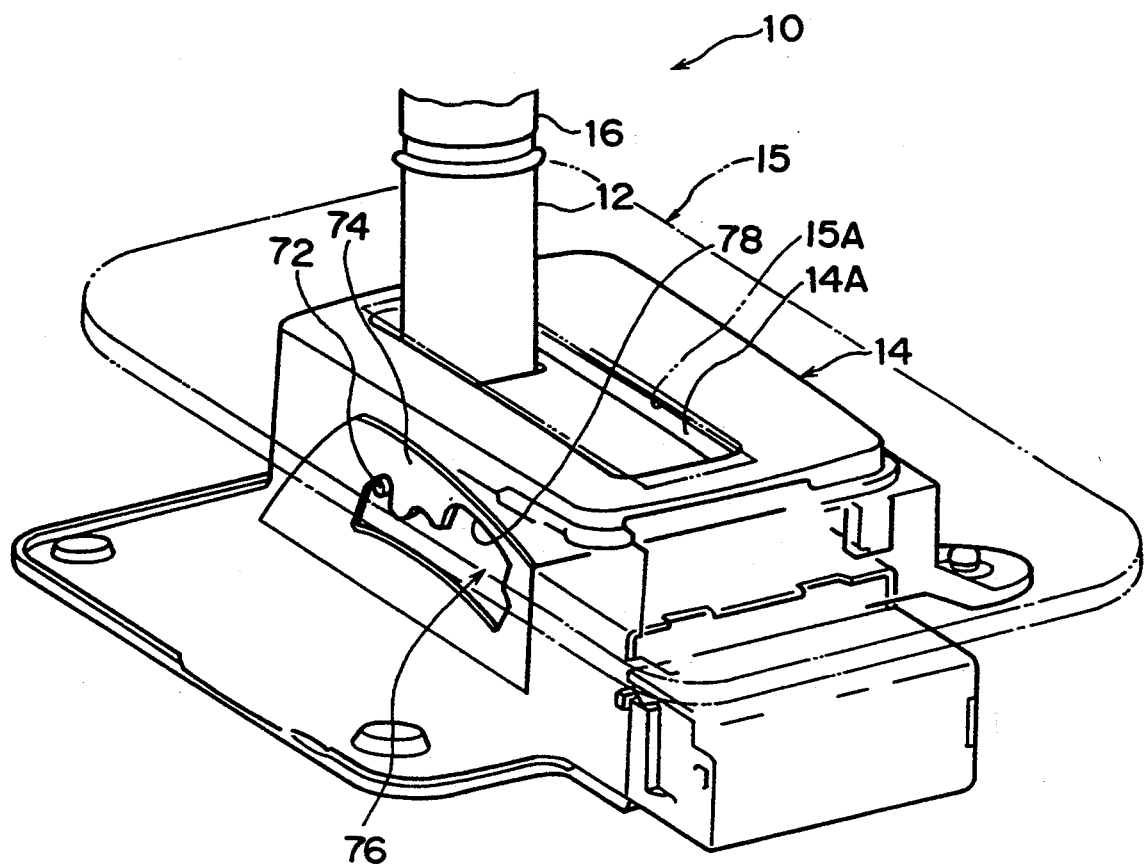
FIG. 3 is a perspective view of a housing used for the shift lever device.

FIGS. 1 through 3 show one embodiment of a shift lever device 10 for a vehicle automatic transmission, to which the present invention is applied.

As shown in FIG. 1, a shift lever 12 of the shift lever device 10 is made of metal and shaped in the form of a hollow cylinder. An axially-extending lower end of the shift lever 12 is swingably supported to an unillustrated bracket fixed to a vehicle body.

As shown in FIG. 3, a portion near an axially-extending upper end of the shift lever 12 extends through an opening 14A defined in the housing 14 and projects toward the interior of a vehicle.

As shown in FIG. 1, a knob 16 is mounted on the upper end of the shift lever 12. The knob 16 has a hollow-shaped base 18 formed of a rigid resin and having upper and lower ends both opened upward and downward. The outer peripheral wall of the base 18 is charged with filler 20 made of a soft resin and covered with a leather 22 structure. The lower end of the base 18 of the knob 16 is fixed to the upper end of the shift lever 12 by screws 92 to threadedly engage with corresponding engagement holes 13 defined in the shift lever 12. On the other hand, a switch holder 24 is formed integrally with the base 18 at the upper end thereof.

A shift button 26 is disposed in an opening defined in the upper end of the knob 16 (i.e., the base 18) in a state in which the top of the shift button 26 projects upward from the knob 16. The shift button 26 has an elongated pin insertion hole 28 defined therein whose longitudinal dimension corresponds to upward and downward directions. Both ends of a pin 29, which is fixedly inserted through a circular hole 25 defined in the switch holder 24, are movably inserted into the pin insertion hole 28. Thus, the shift button 26 is mounted on the knob 16 in such a manner that it can be moved in upward and downward directions via the switch holder 24.

The shift button 26 has a bottom recess 30 defined in the reverse side thereof, which in turn accommodates the upper part of a compression coil spring 32 therein. The lower part of the coiled spring 32 fits on a convex portion 23 formed onto the upper end surface of the switch holder 24. Thus, the coiled spring 32 is urged in the direction in which the shift button 26 projects from the knob 16 (i.e., in an upward direction as seen in FIGS. 1 and 2).

In addition, the shift button 26 has, on one side thereof (i.e., on the left side as seen in FIG. 2), a projection 34 which projects in the direction of the switch holder 24 (i.e., in the downward direction as seen in FIG. 2).

On the other hand, the switch holder 24 accommodates an overdrive switch 38 therein. The overdrive switch 38 has a press controller 39 which projects in the longitudinal direction thereof. When the press controller 39 is pressed toward the inside of the overdrive switch 38, the overdrive switch 38 is turned on.

The overdrive switch 38 has a male connector 40 which projects downward from the lower end thereof. The male connector 40 has an axial center extending in parallel to the axis of the shift lever 12 and is shaped in the form of a hollow square. In addition, the male connector 40 is accommodated in the switch holder 24 together with the overdrive switch 38. The lower end of the male connector 40 is exposed downward from a cut-away portion 31 defined in the switch holder 24. The male connector 40 has a pair of terminals 42 supported by the overdrive switch 38, which projects downward within an opening 41 defined therein.

A female connector 50 is associated with the male connector 40 and can be inserted into and released from the opening 41 of the male connector 40. The female connector 50 has a pair of terminal fitting holes 52 defined therein in which the terminals 42 of the male connector 40 are fitted. Described specifically, when the female connector 50 is inserted into the opening 41, the terminals 42 are fitted in the corresponding fitting holes 52 so that the female connector 50 is connected to the male connector 40. The leading ends of a pair of cords 54 are electrically connected to the terminal fitting holes 52 respectively. The female connector 50 has a plate-shaped interlocking member 56 which projects downward from the lower end of the female connector 50. The female connector 50 is secured to a connector support 60 via the interlocking member 56.

The connector support 60 is formed of a rigid synthetic resin, and faces the upper end of the shift lever 12. A separation member 62 facing a hollow portion 12A of the shift lever 12 is formed integrally with the connector support 60 at the lower end thereof. When the separation member 62 is fitted in the hollow portion 12A of the shift lever 12, the hollow portion 12A is compartmentalized along the axial direction of the shift lever 12.

The connector support 60 has a pair of arms 64 which is formed on one side thereof in parallel to each other and in an opposing relationship. Each of the arms 64 has interlocking holes 66 defined therein, which are associated with the interlocking member 56 of the female connector 50. When the interlocking member 56 is fitted in the interlocking holes 66, the female connector 50 is secured to the connector support 60. Under this condition, the cords 54 of the female connector 50 pass through the hollow portion 12A and are electrically connected to an unillustrated transmission. Thus, the cords 54 are no longer disposed on the outer peripheral surface of the shift lever 12.

The connector support 60 has an opening 68 defined on the other side thereof (i.e., on a side opposite to the arms 64), the opening 68 being used to allow a detent rod 70 to extend therethrough.

The detent rod 70 is disposed within the hollow portion 12A of the shift lever 12 so as to be movable in the axial direction of the shift lever 12. A detent pin 72 (see FIG. 3) is fixedly secured to the lower end of the detent rod 70. The detent pin 72 is inserted into a detent slot 76 defined in a detent plate 74.

On the other hand, a sleeve 80 is coupled to the upper end of the detent rod 70 (see FIG. 1). The sleeve 80 whose upper end is closed is shaped in the form of a cylinder. In addition, the sleeve 80 threadedly engages a screw portion 71 formed on the upper end of the detent rod 70. A locking pin 82 is inserted into the sleeve 80, thereby making it possible to couple and fix the detent rod 70 to the sleeve 80.

A return spring 84 to be wound on the detent rod 70 is disposed-between the sleeve 80 and a spring interlocking member 61 attached to the lower end of the connector support 60. The return spring 84 continuously urges the sleeve 80 in the direction of the shift button 26 (i.e., it urges the connector support 60 in the direction of the shift lever 12 at all times). Thus, as shown in FIG. 3, the detent pin 72 is moved into a notch-shaped restriction portion 78 defined in the uppermost part of the detent slot 76 by an urging force of the return spring 84, thereby preventing the shift lever 12 from being shifted from a specific shift position such as a parking position, etc. to another position.

Accordingly, when the shift button 26 is pressed downward, it is moved toward the housing 14 against the urging force of the return spring 84, so that the detent pin 72 is released from the restriction portion 78, thereby making it possible to swingingly move the shift lever 12 to other shift position.

A cover 90 (see FIG. 2) is mounted on the outer peripheral wall of the lower end of the knob 16. The cover 90 covers the screws 92 and the intermediate portion of the shift lever 12.

A description will now be made of the operation of the present embodiment.

When it is desired to swingably move the shift lever 12 of the shift lever device 10, the shift button 26 is pressed. Under this condition, the shift button 26 is moved in the direction of the housing 14 against the urging force of the coiled spring 32, thereby enabling the projection 34 to move the sleeve 80 in the direction of the housing 14. As a consequence, the detent pin 72 fixed to the lower end of the detent rod 70 is released from the restriction portion 78 of the detent slot 76 defined in the detent plate 74.

Thus, the occupant can grip the knob 16 of the shift lever 12 in such a manner as to be able to swingingly shift the shift lever 12 from its present position to other shift positions.

According to the present invention, the male connector 40 of the overdrive switch 38 accommodated and disposed in the knob 16 and the female connector 50 connected to the male connector 40 are both disposed in alignment with the switch holder 24 formed in the upper end of the base 18. In addition, the cords 54 are provided within the hollow portion 12A of the shift lever 12. Thus, the male and female connectors 40 and 50 are no exposed at the outer peripheral surface of the shift lever 12, and the knob 16 used to cover a part of the shift lever 12 can be rendered small in size. As a consequence, design restrictions of the knob 16 are reduced, so that the design of the knob 16 can be established more freely. In addition, the dimensions of the opening 14A defined in the housing 14 can be reduced.

When it is desired to mount the knob 16 on the shift lever 12, the knob 16 is simply placed in a position above the shift lever 12 and moved toward the housing 14. In doing so, the terminals 42 of the male connector 40 of the overdrive switch 38 are fitted in the terminal fitting holes 52 defined in the female connector 50. Hence the male connector 40 of the overdrive switch 38 is coupled to the female connector 50. As a consequence, the knob 16 can be mounted on the shift lever 12.

The sleeve 80 is fixedly secured to the detent rod 70 via the locking pin 82. Therefore, the present embodiment differs from a conventional arrangement of a type that the sleeve is simply threadedly engaged with the detent rod. Accordingly, there is little possibility of the sleeve 80 being rotated. The sleeve 80 is held in a proper mounting position at all times.

Upon reassembly of the knob 16 onto the shift lever 12 in particular as in the conventional example, there was the possibility of the length of the detent rod 70 being substantially changed by the angular displacement of the sleeve 80 and the detent pin 72 being released from the restriction portion 78 of the detent plate 74 even when the shift button 26 is not pressed. In order to avoid the possibility referred to above, it was necessary to deliver the shift lever device in a state in which the knob 16 is mounted on the shift lever 12.

According to the present invention, however, the sleeve 80 is fixed to the detent rod 70, and hence only the sleeve 80 and the detent rod 70 can be connected to each other upon delivery of the shift lever device 10. As a consequence, the knob 16 can be mounted on the shift lever 12 after the shift lever 12 is incorporated into the housing 14 (i.e., a console box 15 as shown in FIG. 3). Accordingly, the shape of an opening 15A defined in the console box 15 can be reduced to such an extent that the shift lever 12 can be inserted into the opening 15A. In addition, the housing 14 can be covered with the console box 15, and the degree of freedom on the design relative to, for example, the extension of respective surfaces into a single flat form can be improved.

When it is desired to release the knob 16 from the shift lever 12, the knob 16 is pulled against the housing 14 after the screws 92 are disengaged. Consequently, the male connector 40 is released from being coupled to the female connector 50. It is therefore unnecessary to carry out a process on a large scale, such as disconnection of the housing 14 from the shift lever 12, etc., so that even users can simply and rapidly release the knob 16 from the shift lever 12.

Since the male connector 40 of the overdrive switch 38 is directly connected to the female connector 50 in the present embodiment, it is unnecessary to use junction terminals between the male connector 40 and the female connector 50. Therefore, the insert molding of the junction terminals into the overdrive switch 38 is unnecessary. Hence the efficiency of product assembly can be improved and the manufacturing cost of respective components can be reduced.

Incidentally, the shift lever 12 and the connector support 60 are provided in discrete manner in the present embodiment. However, the shift lever 12 may be formed integrally with the connector support 60.

Having now fully described the invention, it will be apparent to those skilled in the art that many changes and modifications can be made without departing from the spirit or scope of the invention as set forth herein.

What is claimed is:

1. A shift lever device comprising:
   a shift lever mounted on a housing, said shift lever having a support member mounted thereon and a protection member which projects in the axial direction thereof from the lower end of said support member and which is inserted into and disposed within said shift lever;
   a knob mounted on one end of said shift lever, said knob being gripped by an occupant so as to activate said shift lever;
   first connecting means having electrically connected cords, which transmit electricity generated by a power source and which pass through the inside of said shift lever, and an interlocking member which projects from a lower end of said first connecting means, said interlocking member engaging with said support member such that said first connecting means is mounted on said shift lever so that said first connecting means is held in a position radially inward of the outer peripheral surface of one of said shift lever and an extension thereof, said cords being protected from interfering with other components by said protection member; and
   second connecting means mounted on said knob, said second connecting means being electrically connected to said first connecting means to transmit electricity to said first connecting means.

2. A shift lever device according to claim 1, wherein said second connecting means is connected integrally with a switch operated by the occupant so as to be held by the knob.

3. A shift lever device according to claim 1, wherein said first connecting means and said second connecting means include junctions wherein said junctions of said first connecting means fit in corresponding junctions of said second connecting means when said knob is inserted into said shift lever.

4. A shift lever device according to claim 1, wherein said support member is mounted on an opening defined in the upper end of said shift lever so as to hold said first connecting means in the position inwardly away from the radial direction of the extension of said shift lever.

5. A shift lever device according to claim 3, wherein one of said first connecting means and said second connecting means has an opening defined therein and a pair of terminals disposed within said opening as male connectors which project in the direction in which said terminals are inserted into corresponding portions.

6. A shift lever device according to claim 5, wherein the other of said first and second connecting means has a pair of terminal fitting holes defined therein, said terminals disposed within said opening being fitted in said holes.

7. A shift lever device according to claim 6, wherein said second connecting means is fixed to said knob, said second connecting means being connectable to and disconnectable from said first connecting means.

8. A shift lever device according to claim 7, wherein said knob has a fitting stroke defined from the time that said first connecting means is fitted in said second connecting means so as to be connected to each other.

9. A shift lever device according to claim 1, wherein said first connecting means is forced in the same direction as the axial direction of said shift lever such that said interlocking member engages with said support member, thereby holding said first connecting means in position.

10. A shift lever device comprising:
    a shift lever mounted on a housing, said shift lever having a support member mounted thereon and a protection member which projects in the axial direction thereof from the lower end of said support member and which is inserted into and disposed within said shift lever;

a knob mounted on one end of said shift lever, said knob being gripped by an occupant so as to activate said shift lever;

first connecting means having electrically connected cords, which transmit electricity generated by a power source and which pass through the inside of said shift lever, and an interlocking member which projects from a lower end of said first connecting means, said interlocking member engaging with said support member such that said first connecting means is mounted on said shift lever so that said first connecting means is held in a position inwardly away from either radially inward of the outer peripheral surface of one of said shift lever and an extension thereof, said cords being protected from interfering with other components by said protection member; and second connecting means connected integrally with a switch operated by the occupant so as to be mounted on said knob, said second connecting means having a structure with junctions thereof fitted in corresponding junctions of said first connecting means, said second connecting means transmitting electricity switched by said switch to said first connecting means at the time that said knob is inserted into said shift lever.

11. A shift lever device according to claim 10, wherein one of said first connecting means and said second connecting means has an opening defined therein and a pair of terminals disposed within said opening as male connectors which project in the direction in which said terminals are inserted into corresponding portions, and the other of said first and second connecting means has a pair of terminal fitting holes defined therein, said terminals disposed within said opening being fitted in said holes.

12. A shift lever device according to claim 10, wherein said second connecting means is fixed to said knob, said second connecting means being connectable to and disconnectable from said first connecting means.

13. A shift lever device according to claim 12, wherein said knob has a fitting stroke defined from the time that said first connecting means is fitted in said second connecting means so as to be connected to each other.

14. A shift lever device comprising:

a shift lever mounted a housing, said shift lever having a support member mounted thereon and a protection member which projects in the axial direction thereof from the lower end of said support member;

a knob mounted on one end of said shift lever, said knob being gripped by an occupant so as to activate said shift lever;

first connecting means having electrically connected cords which transmit electricity generated by a power source and which pass through the inside of said electrically connected shift lever, and an interlocking member projecting from the lower end thereof, said first connecting means being mounted on said shift lever via said support member mounted on an opening defined in the upper end of said shift lever, and forced in the same direction as the axial direction of said shift lever so that said interlocking member is engaged with said support member, such that said first connecting means is held in a position radially inward of the outer peripheral surface of one of said shift lever and an extension thereof, said first connecting means further having a pair of terminal fitting holes defined therein for fitting therein a pair of terminals provided within said opening, said cords being protected from interfering with other components by said protection member; and second connecting means having an opening defined therein and a pair of terminals provided within said opening, said terminals serving as male connectors which project in the direction in which said terminals are inserted into said terminal fitting holes, said second connecting means being connected integrally with a switch operated by the occupant, thereby enabling a combination of said second connecting means and said switch to be mounted on said knob, said second connecting means being connectable to and disconnectable from said first connecting means, and said second connecting means having a structure with junctions thereof fitted in corresponding junctions of said first connecting means, said second connecting means transmitting electricity switched by said switch to said first connecting means at the time that said knob is inserted into said shift lever.

15. A shift lever device according to claim 14, wherein said knob has a fitting stroke defined from the time that said first connecting means is fitted in said second connecting means so as to be connected to each other.

16. A shift lever device according to claim 10, wherein said first connecting means is forced in the same direction as the axial direction of said shift lever such that said interlocking member engages with said support member mounted on an opening defined in the upper end of said shift lever to hold said first connecting means in a position inwardly away from the radial direction of the range over which said shift lever extends.

* * * * *